Patented Aug. 15, 1944

2,355,971

UNITED STATES PATENT OFFICE 2,355,971

PROCESS FOR ACYLATION

Virgil L. Hansley, Niagara Falls, N. Y., assignor to E. I. du Pont de Nemours & Company, Wilmington, Del., a corporation of Delaware No Drawing. Original application April 19, 1941, Serial No. 389,360. Divided and this application August 20, 1943, Serial No. 499,382

9 Claims. (Cl. 260—491)

This invention relates to a process for the acylation of organic compounds and particularly to a process for the acylation of certain secondary alcohols which utilizes vinyl esters as acylating agents.

This application is a division of my copending application, Serial Number 389,360, filed April 19, 1941; now Patent No. 2,342,613.

The prior art discloses no method for utilizing vinyl esters as acylating agents in the acylation of the substituted secondary alcohols with which the present invention is concerned.

One of the objects of this invention is to provide a new and improved method for the acylation of certain secondary alcohols. Another object is to provide a practical and economical method for the acylation of these secondary alcohols by which good yields of the desired ester may be obtained. A further object is to provide a method for the acylation of certain secondary alcohols which is simple to operate and which may be carried out at comparatively low temperatures in easily obtainable equipment. These and other objects will be apparent from the ensuing description of my invention.

The above objects are attained in accordance with my invention by reacting a vinyl ester with certain secondary alcohols in the presence of certain alkali metal salts which are sufficiently alkaline to maintain a pH greater than 7.0 in the reaction medium.

I have found that when a vinyl ester, for example vinyl acetate, is added to certain secondary alcohols in the presence of such alkali metal salts the reaction is smooth, rapid, and substantially complete and the desired ester is readily obtained in good yield.

The alkali metal salts which I have found effective as catalysts for the reaction between the secondary alcohols and vinyl esters are the alkali metal cyanides, silicates, carbonates, and tetraborates, for example, sodium cyanide, potassium cyanide, sodium silicate, sodium carbonate, and sodium tetraborate. I have discovered that when one of these salts or mixtures of two or more of these salts are added to a mixture containing a vinyl ester and certain secondary alcohols in amounts sufficient to maintain a pH greater than 7.0, good yields of the desired ester are obtained. When the pH of the reaction medium is maintained considerably above 7.0, for instance 8.0 to 9.0 or higher, the reaction may be very rapid and in some cases, violent. At a pH of 7.0 or lower, little or no reaction occurs and I have discovered that it is essential that sufficient of the alkali metal salt be utilized to maintain the pH of the reaction medium somewhat above 7.0 in order to obtain appreciable quantities of the desired ester by the process of my invention. I prefer to maintain a pH of 7.5 to 9.0, since I have found that in general the best results are obtained within this range.

However, the pH of the reaction medium may be maintained above 9.0 by means of the alkali metal salt catalyst with satisfactory results, and in certain cases, for example, such procedure may be desirable when utilizing secondary alcohols which react comparatively slowly with the vinyl ester.

The rate of reaction may be controlled by the rate of addition of the alkali metal salt catalyst or one of the reactants and cooling or heating the reaction mixture. While the reaction with some secondary alcohols is rapid and strongly exothermic, with others the reaction is slower and in some instances a longer time or higher temperature or a combination of these conditions may be utilized to insure complete reaction. For instance, in some cases it has proven desirable to permit the reaction mixture to stand at room temperature for a few days or to reflux the reaction mixture in order to insure complete reaction.

The particular alkali metal salt catalyst which is most suitable for use in carrying out a specified acylation according to my invention may depend upon the solubility of the salt in the particular reaction medium concerned or the choice may depend upon economic considerations since I have found that in general the alkali metal salt catalysts of the present invention are all sufficiently soluble to produce satisfactory results in any desired acylation. In general, I prefer to add anhydrous catalysts to the reactants, since the presence of water tends to cause loss of the desired product by hydrolysis. However, hydrated salts or salts containing small amounts of free moisture are operable in the process of my invention.

My process may be carried out at any desired temperature compatible with the particular reactants used and the product obtained. Generally I have found it desirable to operate my process at about room temperature and in some cases as high as 80° C. to 100° C. In some instances it may be preferable to reflux the reaction mixture to insure complete reaction.

I am aware of the fact that it has been proposed to utilize acid catalysts for the acylation of primary alcohols but I have found that acidic catalysts are ineffective for the acylation of the substituted secondary alcohols with which the present invention is concerned.

The secondary alcohols which are within the scope of my invention are those compounds represented by the formula

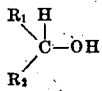

wherein $R_2$ is selected from the group consisting of halo-methyl, cyano, cyano-methyl, aldo-methyl, hydroxy-methyl, alkoxy-methyl, aryloxy-methyl, acyloxy-methyl, ester, and 2-oxy-2 cyano-ethyl radicals, and $R_1$ is selected from the group consisting of alkyl, aryl, hydro-aromatic, hydroxy-alkyl, and radicals identical with $R_2$.

Throughout the claims the substituent radicals of the secondary alcoholic compounds which are operable in the process of my invention are defined as follows: halo-methyl designates the radicals, $-CH_2X$ in which X may be chlorine, bromine, or iodine; the cyano radical, $-CN$; cyano-methyl, $-CH_2CN$; hydroxy-methyl, $-CH_2OH$; ester, $-COOY$ and acyloxy-methyl, $-CH_2OOCY$, in which Y is an alkyl or aryl radical; aldo-methyl, $-CH_2CHO$; alkoxy or aryloxy methyl, $-CH_2OY$ in which Y is an alkyl or aryl radical; 2-oxy 2-cyano ethyl,

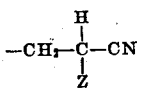

in which Z is an oxy radical; and hydro-aromatic is a cyclo-paraffin radical such as cyclo-hexyl.

Illustrative of the secondary alcohols which I have observed to acylate readily in accordance with the process of my invention are methyl lactate, aldol, glycerol, diacetin, aldol cyanhydrin, lactonitrile, and glycerol alpha-gamma-dichloro-hydrin. Compounds such as aceto-acetic ester and beta-cyano beta-acetoxyethyl methyl carbinol are also operative in the process of my invention.

The following procedure illustrates a satisfactory method of carrying out the process of my invention. The secondary alcohol to be acylated is placed in a suitable reaction vessel. For carrying out the process on a small scale a three-necked flask equipped with a stirrer and inlet for vinyl ester may conveniently be used. The reaction flask is immersed in a bath arranged for heating or cooling and sufficient alkali metal salt catalyst is added to the compound to be acylated to maintain an alkaline reaction medium. The viny lester is added gradually to the contents of the flask while the reaction mixture is agitated. The rate of addition of vinyl ester and the rate of cooling or heating are adjusted so as to maintain the desired reaction temperature. The reaction in most instances is rapid and is substantially complete by the time the vinyl ester has been added. When the reaction is completed the product may be isolated by distillation. The alkali may be neutralized before distillation to avoid hydrolysis.

The following examples illustrate the process of my invention:

*Example 1*

Methyl lactate, 546 gms., containing 5 grms. of dissolved potassium cyanide was charged into a reaction system consisting of a coil of ⅛ inch stainless steel pipe immersed in a cooling bath at 25° C. and connected to a reservoir and a circulation pump. By means of the circulation pump the reaction mixture was made to flow from the reservoir thru the coil and pump and back to the reservoir again thus providing both cooling and agitation. Vinyl acetate, 453 gms. was introduced slowly over a period of 0.5 hr. The heat generated by the reaction was removed practically at once by the cooling bath so that the temperature of the reactants never was over 29° C. Methyl lactate acetate, B. P. 40–50° C. at 2 mm. was obtained in 85% yield.

*Example 2*

Lactonitrile, 355 gms., containing sufficient potassium cyanide to give a pH of 8.0 to 9.0 was charged into a three-liter three-neck flask immersed in a cooling bath (10–15° C.). The flask was fitted with a stirrer and an inlet for vinyl acetate. Vinyl acetate, 456 gms., was added over a period of 15 minutes which with the cooling provided just maintained a reaction temperature of 20–25° C. The reaction product was rectified immediately thereafter at atmospheric pressure. A yield of 87.5% of lactonitrile acetate, B. P. 160–170° C., was obtained.

*Example 3*

The circulation system described in Example 2 charged with 500 gms. of aldol containing 5 gms. of dissolved potassium cyanide was treated at 20–25° C. with 488 gms. of vinyl acetate. The distillation of a 510 gm. aliquot of the reaction mixture gave 320 gms. or an 86.5% yield of aldol acetate, B. P. 70–85° C. at 2–3 mm.

Comparable results are obtained when sodium cyanide, sodium silicate, sodium carbonate, or sodium tetraborate is substituted for the potassium cyanide catalyst in the foregoing examples.

In general I prefer to use approximately equimolecular proportions of secondary alcohol and vinyl ester, since the reaction is substantially complete and an excess of either reactant is not required. However, in some instances it may be found desirable to use an excess of one of the reactants. For example, such an excess may be utilized as a solvent for the reaction mixture.

Many modifications of my invention may be made without departing from the scope thereof. My process may be carried out as a batch or as a continuous process. Moreover, the reaction may be carried out in the presence of solvents inert with respect to the reactants and catalyst employed. Also the products may be recovered by means other than distillation. For example, the acetaldehyde formed may be removed by adding an agent which will react with the acetaldehyde to form a compound capable of being removed by mechanical means. Vinyl esters other than vinyl acetate, for instance vinyl formate, vinyl propionate or vinyl butyrate may be utilized as the acylating agent. Many other modifications will be apparent to those skilled in the art without departing from the scope of this invention, the essential feature of which comprises a process for the acylation of certain secondary alcohols by reacting said alcohols with a vinyl ester in the presence of alkali metal cyanides, silicates, carbonates, or tetraborates, and maintaining an alkaline reaction medium by means of said alkali metal salts.

The process of my invention is useful in the preparation of a wide variety of esters which may be used as solvents or for the synthesis of other compounds.

The process of my invention possesses many advantages which will be apparent to those skilled in the art. The process is simple and easily operated on any desired scale, high yields of the desired esters are obtained and the product is easily isolated in pure form. Furthermore, the use of an alkali metal salt as a catalyst avoids the necessity for corrosion resistant equipment such as is required by a process which utilizes acidic materials. A further important advantage resides in the fact that the process of my invention may be operated efficiently at comparatively low temperatures thus avoiding undesirable side reactions and consequent loss in yield which occur at high temperatures. The process of my invention is valuable for the preparation of esters of certain secondary alcoholic compounds since no previous method which utilizes vinyl esters for the acylation of these compounds is known.

I claim:

1. The process for the acylation of methyl lactate which comprises reacting a vinyl ester with methyl lactate in the presence of a compound selected from the group consisting of alkali metal cyanides, silicates, carbonates, and tetraborates, and maintaining the pH of the reaction mixture above 7.0 by means of said compound.

2. The process which comprises reacting vinyl formate with methyl lactate in the presence of a compound selected from the group consisting of alkali metal cyanides, silicates, carbonates, and tetraborates, and maintaining the pH of the reaction mixture above 7.0 by means of said compound.

3. The process which comprises reacting vinyl butyrate with methyl lactate in the presence of a compound selected from the group consisting of alkali metal cyanides, silicates, carbonates, and tetraborates, and maintaining the pH of the reaction mixture above 7.0 by means of said compound.

4. The process for the acylation of methyl lactate which comprises reacting a vinyl ester with methyl lactate in the presence of potassium cyanide, and maintaining the pH of the reaction mixture above 7.0 by means of said potassium cyanide.

5. The process for the acylation of methyl lactate which comprises reacting vinyl acetate with methyl lactate in the presence of potassium cyanide, and maintaining the pH of the reaction mixture above 7.0 by means of said potassium cyanide.

6. The process for the acylation of methyl lactate which comprises reacting a vinyl ester with methyl lactate in the presence of sodium cyanide, and maintaining the pH of the reaction mixture above 7.0 by means of said sodium cyanide.

7. The process for the acylation of methyl lactate which comprises reacting vinyl acetate with methyl lactate in the presence of sodium cyanide, and maintaining the pH of the reaction mixture above 7.0 by means of said sodium cyanide.

8. The process for the acylation of methyl lactate which comprises reacting a vinyl ester with methyl lactate in the presence of sodium silicate, and maintaining the pH of the reaction mixture above 7.0 by means of said sodium silicate.

9. The process for the acylation of methyl lactate which comprises reacting vinyl acetate with methyl lactate in the presence of sodium silicate, and maintaining the pH of the reaction mixture above 7.0 by means of said sodium silicate.

VIRGIL L. HANSLEY.